US012055115B2

(12) United States Patent
Suganuma

(10) Patent No.: US 12,055,115 B2
(45) Date of Patent: Aug. 6, 2024

(54) INJECTION CONTROL DEVICE

(71) Applicant: DENSO CORPORATION, Kariya (JP)

(72) Inventor: Yohei Suganuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/360,493

(22) Filed: Jul. 27, 2023

(65) Prior Publication Data

US 2024/0044302 A1 Feb. 8, 2024

(30) Foreign Application Priority Data

Aug. 5, 2022 (JP) ................................ 2022-125583

(51) Int. Cl.
*F02D 41/24* (2006.01)
*F02D 41/20* (2006.01)

(52) U.S. Cl.
CPC .. *F02D 41/2467* (2013.01); *F02D 2041/2003* (2013.01); *F02D 2200/0602* (2013.01); *F02D 2200/0606* (2013.01)

(58) Field of Classification Search
CPC ..................................................... F02D 4/2407
See application file for complete search history.

(56) References Cited

U.S. PATENT DOCUMENTS

2012/0240670 A1* 9/2012 Takashima .......... F02D 41/2467 73/114.49
2012/0253639 A1* 10/2012 Nonoyama ......... F02D 41/0025 701/103
2014/0109873 A1* 4/2014 Allezy ................ F02D 41/0047 123/435
2018/0195450 A1 7/2018 Mukaihara et al.
2018/0258877 A1* 9/2018 Satake .................... F02D 41/20
2019/0170075 A1 6/2019 Satake et al.
2021/0199067 A1* 7/2021 Oh .......................... F02D 41/20

FOREIGN PATENT DOCUMENTS

JP 2014-227950 A 12/2014

OTHER PUBLICATIONS

U.S. Appl. No. 18/360,399, filed Jul. 27, 2023, Mori.

* cited by examiner

*Primary Examiner* — John Kwon
(74) *Attorney, Agent, or Firm* — Posz Law Group, PLC

(57) ABSTRACT

An injection control device includes an injection controller configured to control a fuel injection valve, which is driven by a charging voltage obtained by boosting a battery voltage, to perform a multi-stage injection in which fuel injection is performed a plurality of times in one cycle for each cylinder. The injection controller is configured to learn a second minute injection and/or a minute injection subsequent to the second minute injection in the multi-stage injection and correct an injection amount.

7 Claims, 8 Drawing Sheets

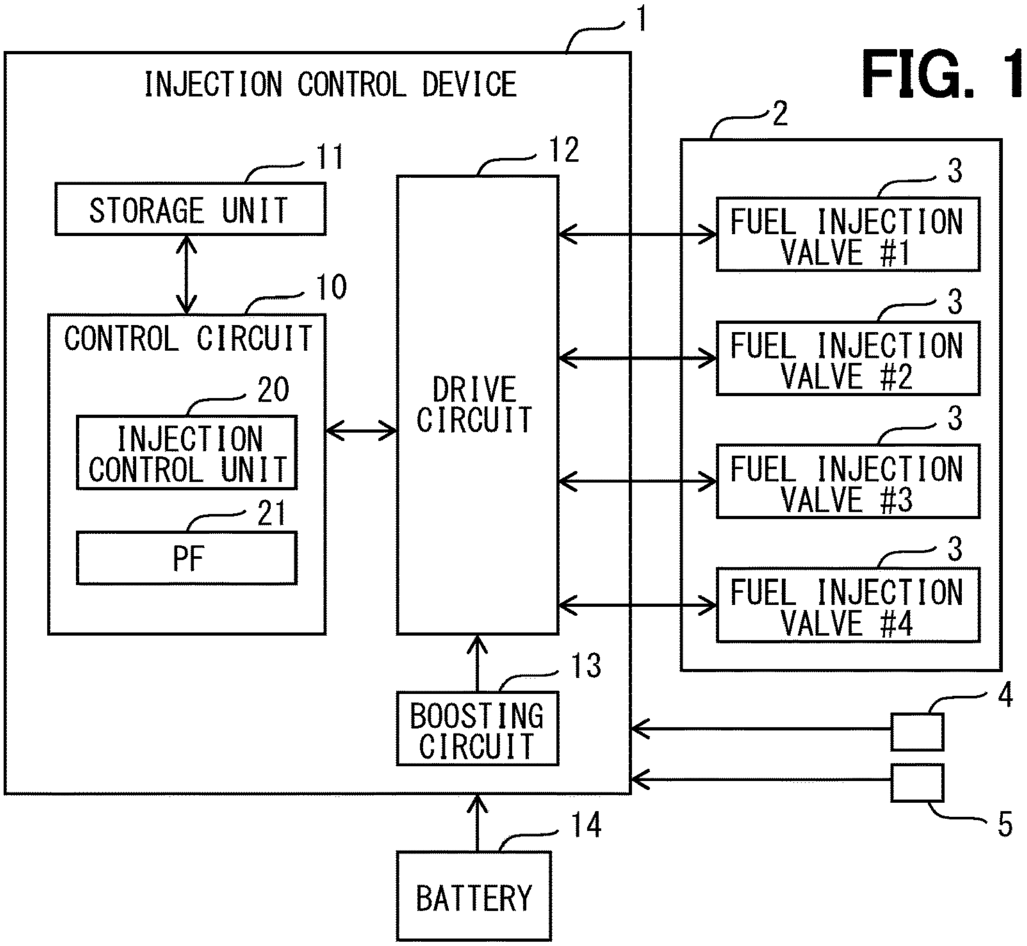
FIG. 1
FIG. 2
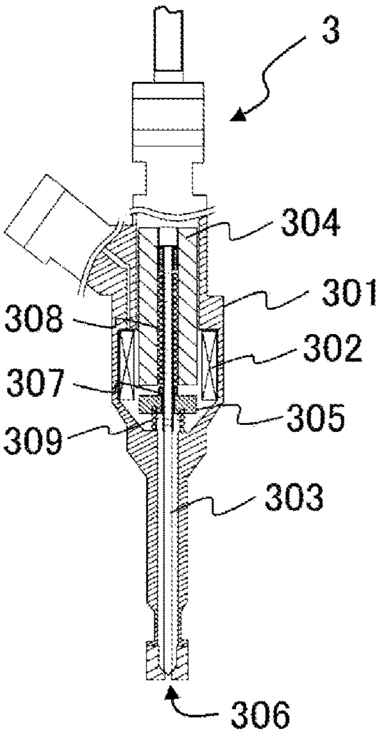

INJECTION CONTROL DEVICE

CROSS REFERENCE TO RELATED APPLICATION

The present application claims the benefit of priority from Japanese Patent Application No. 2022-125583 filed on Aug. 5, 2022. The entire disclosures of all of the above applications are incorporated herein by reference.

TECHNICAL FIELD

The present disclosure relates to an injection control device that controls a fuel injection valve.

BACKGROUND

In the related art, a multi-stage injection in which fuel injection is performed multiple times in one cycle for each cylinder is known.

SUMMARY

According to an aspect of the present disclosure, an injection control device comprises an injection controller configured to control a fuel injection valve, which is driven by a charging voltage obtained by boosting a battery voltage, to perform a multi-stage injection in which fuel injection is performed a plurality of times in one cycle for each cylinder.

BRIEF DESCRIPTION OF THE DRAWINGS

The above and other objects, features and advantages of the present disclosure will become more apparent from the following detailed description made with reference to the accompanying drawings. In the drawings:

FIG. 1 is a diagram showing a configuration example of an injection control device according to an embodiment;

FIG. 2 is a diagram showing a configuration example of a fuel injection valve;

DETAILED DESCRIPTION

Figure 3:
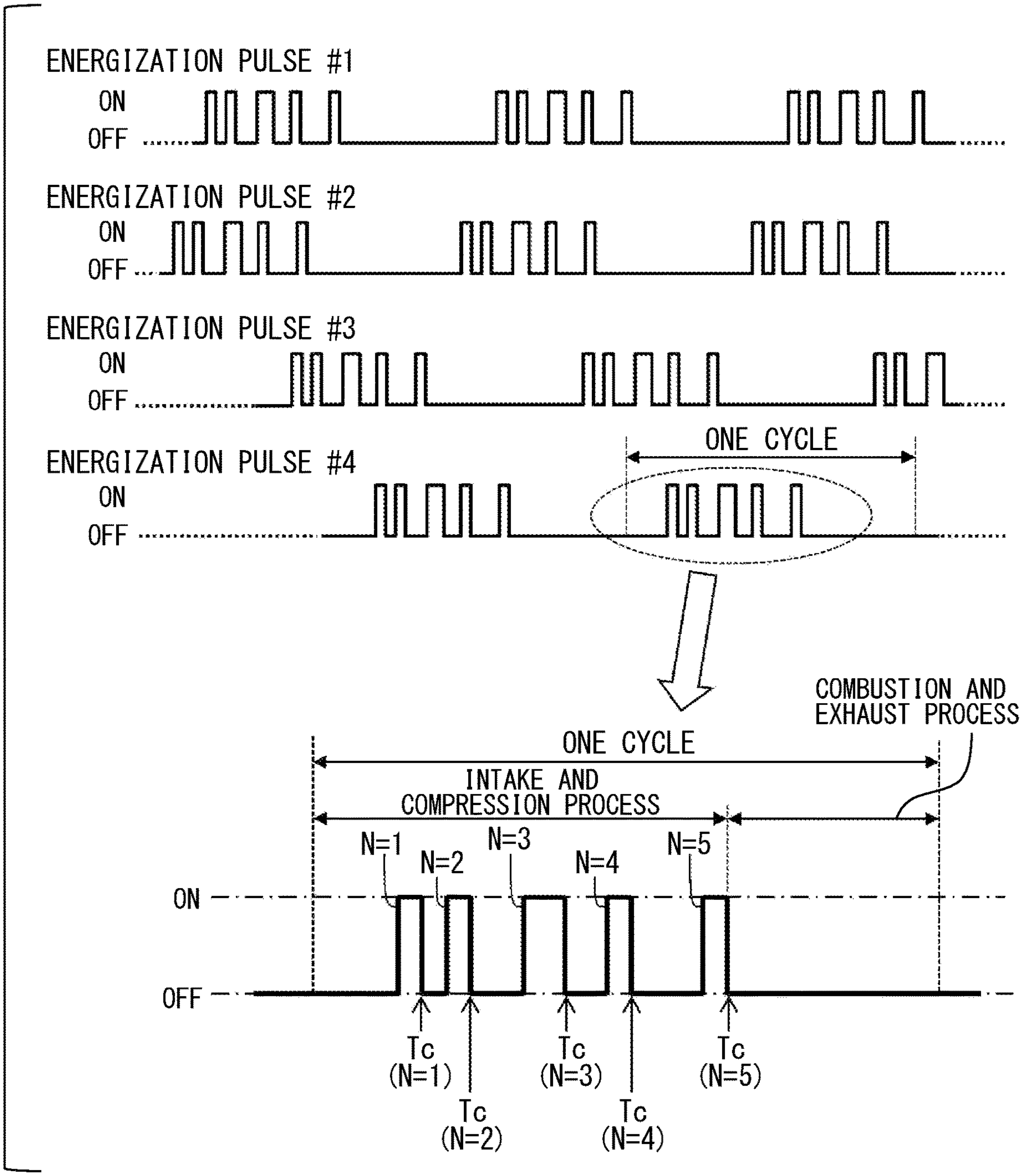
FIG. 3 is a diagram showing an example of a drive signal applied to the fuel injection valve.

Hereinafter, examples of the present disclosure will be described.

As a technique for reducing nitrogen oxides and fine particulate matter discharged from an internal combustion engine, a multi-stage injection in which fuel injection is performed multiple times in one cycle for each cylinder is known. Hereinafter, a series of strokes including intake, compression, combustion, and exhaust in each cylinder is referred to as one cycle.

A required total injection amount required in one cycle is determined based on an operation condition or the like.

Therefore, in the multi-stage injection, a minute injection in which an injection amount of one injection is smaller than the required total injection amount is performed. It is assumed that the injection amount of the minute injection varies depending on mechanical characteristics of a fuel injection valve. Therefore, it is conceivable that, for example, the injection amount is corrected by improving detection accuracy of a valve closing timing of the fuel injection valve.

However, when the minute injection is performed at a relatively short interval as in the multi-stage injection, a behavior of the fuel injection valve in the second and subsequent injections may change due to an electromotive force of a former-stage injection. In this case, even when a learning result of the first injection is applied to the correction of the second and subsequent injections, injection accuracy may not be improved.

According to an example of the present disclosure, an injection control device includes an injection controller configured to control a fuel injection valve, which is driven by a charging voltage obtained by boosting a battery voltage, to perform a multi-stage injection in which fuel injection is performed a plurality of times in one cycle for each cylinder. The injection controller is configured to perform learning of a second minute injection and/or a minute injection subsequent to the second minute injection in the multi-stage injection and correcting of an injection amount.

Accordingly, even when the behavior of the fuel injection valve in the second and subsequent injections is different from the behavior in the first injection due to an influence of the electromotive force of the former-stage injection or the like, a difference in behavior can be corrected by performing learning, and correction accuracy in the multi-stage injection can be improved.

Hereinafter, an embodiment will be described with reference to the drawings. As shown in FIG. 1, an injection control device 1 according to the present embodiment controls fuel injection valves 3 provided in an internal combustion engine 2. For example, when the internal combustion engine 2 is a four-cylinder internal combustion engine for a vehicle, the internal combustion engine 2 is provided with the fuel injection valves 3 in a first cylinder indicated by #1, a second cylinder indicated by #2, a third cylinder indicated by #3, and a fourth cylinder indicated by #4, respectively. However, a configuration of the internal combustion engine 2 shown in FIG. 1 is an example, and for example, the number of cylinders may be different.

As shown in FIG. 2, a solenoid coil 302, a valve body 303, a fixed core 304, and a movable core 305 are accommodated in a body 301 of the fuel injection valve 3. The valve body 303 has a cylindrical shape as a whole, has a conical tip on a lower side in FIG. 2, and is movable in an axial direction. An injection hole 306 for injecting fuel is provided at a tip on a lower end of the body 301 in FIG. 2.

The fixed core 304 is formed in a cylindrical shape by a magnetic material, and an inner peripheral side thereof is a space through which fuel flows when the valve body 303 moves. The movable core 305 formed in a disc shape having a through hole at a center using a metallic magnetic material is disposed on an injection hole 306 side of the fixed core 304. The movable core 305 is provided to be movable in the axial direction on an inner peripheral side of the solenoid coil 302 in a state where the valve body 303 penetrates an inner peripheral side of the movable core 305. When the solenoid coil 302 is not energized, the movable core 305 is located at an initial position facing the fixed core 304 with a predetermined gap therebetween. A locking portion 307 fixed to the valve body 303 is in contact with an upper surface of the movable core 305.

A first spring 308 that elastically presses the valve body 303 toward the injection hole 306 side is provided on the inner peripheral side of the fixed core 304 while being wound around the valve body 303. On the other hand, a second spring 309 that elastically attracts the movable core 305 to the initial position is provided on the injection hole 306 side of the movable core 305 while being fixed to the body 301.

In the fuel injection valve 3, when the solenoid coil 302 is energized, the movable core 305 moves to the fixed core 304 against an elastic force of the second spring 309. As the locking portion 307 is pressed up along with the movement of the movable core 305, the valve body 303 also moves in the axial direction. Even when the movable core 305 moves and comes into contact with the fixed core 304, the valve body 303 and the locking portion 307 are movable in the axial direction inside the fixed core 304. That is, the fuel injection valve 3 has a structure in which mechanical characteristics such as the elastic forces of the first spring 308 and the second spring 309 influence the fuel injection.

Fuel is supplied to each fuel injection valve 3 from a fuel supply system (not shown). The fuel supply system is provided with a pressure sensor 4 that detects a fuel pressure and a temperature sensor 5 that detects a fuel temperature. The fuel pressure detected by the pressure sensor 4 and the fuel temperature detected by the temperature sensor 5 are input to the injection control device 1 as parameters for calculations.

As shown in FIG. 1, the injection control device 1 includes a control circuit 10, a storage unit 11, a drive circuit 12, and a boosting circuit 13. The control circuit 10 includes a microcomputer, and controls the entire injection control device 1 by executing a program stored in the storage unit 11. The storage unit 11 is implemented as a non-volatile storage medium such as a flash memory, and stores various data used in the injection control device 1 and data such as a learning result to be described later.

The drive circuit 12 generates and outputs a drive signal for driving the fuel injection valve 3 based on a command value output from the control circuit 10, and outputs various parameters acquired from the fuel injection valve 3 to the control circuit 10. The drive signal is generated in a pulse form by a charging voltage that is obtained by boosting, by the boosting circuit 13, a battery voltage supplied from a battery 14. For example, as shown in FIG. 3, in the case of the four-cylinder internal combustion engine, an injection order is #1 →#3 →#4 →#2, and drive signals of energization pulses of #1 to #4 are output to the fuel injection valves 3 of the cylinders according to the injection order.

In the fuel injection valve 3, when the energization pulse is turned on, the solenoid coil 302 is energized, and the valve body 303 moves to inject fuel. On the other hand, when the energization pulse is turned off, the energization of the solenoid coil 302 is stopped, and the fuel injection valve 3 stops fuel injection. As shown in an enlarged view of a part of the fuel injection valve 3, assuming that one cycle includes an intake stroke, a compression stroke, a combustion stroke, and an exhaust stroke in one cylinder, an on-off state of each energization pulse is switched multiple times in one cycle. The injection order shown in FIG. 3 is an example.

Thus, the fuel injection valve 3 is controlled by the multi-stage injection in which the fuel injection is performed multiple times in one cycle for each cylinder. Hereinafter, the first injection in one cycle is defined as N=1, the second injection is defined as N=2, the third injection is defined as N=3, the fourth injection is defined as N=4, and the fifth injection is defined as N=5. The first injection in the multi-stage injection, that is, an injection of N=1 is also referred to as an initial-stage injection, and an injection of the second and subsequent injections, that is, an injection of N≥2 is referred to as a subsequent-stage injection.

The control circuit 10 includes an injection control unit (injection controller) 20 and a platform 21 indicated as PF in FIG. 1. The injection control unit 20 and the platform 21 are implemented by software by executing programs by the control circuit 10. The platform 21 is a software group implemented by, for example, driver software that exchanges signals and data between the injection control unit 20 and an external circuit.

Figure 4:
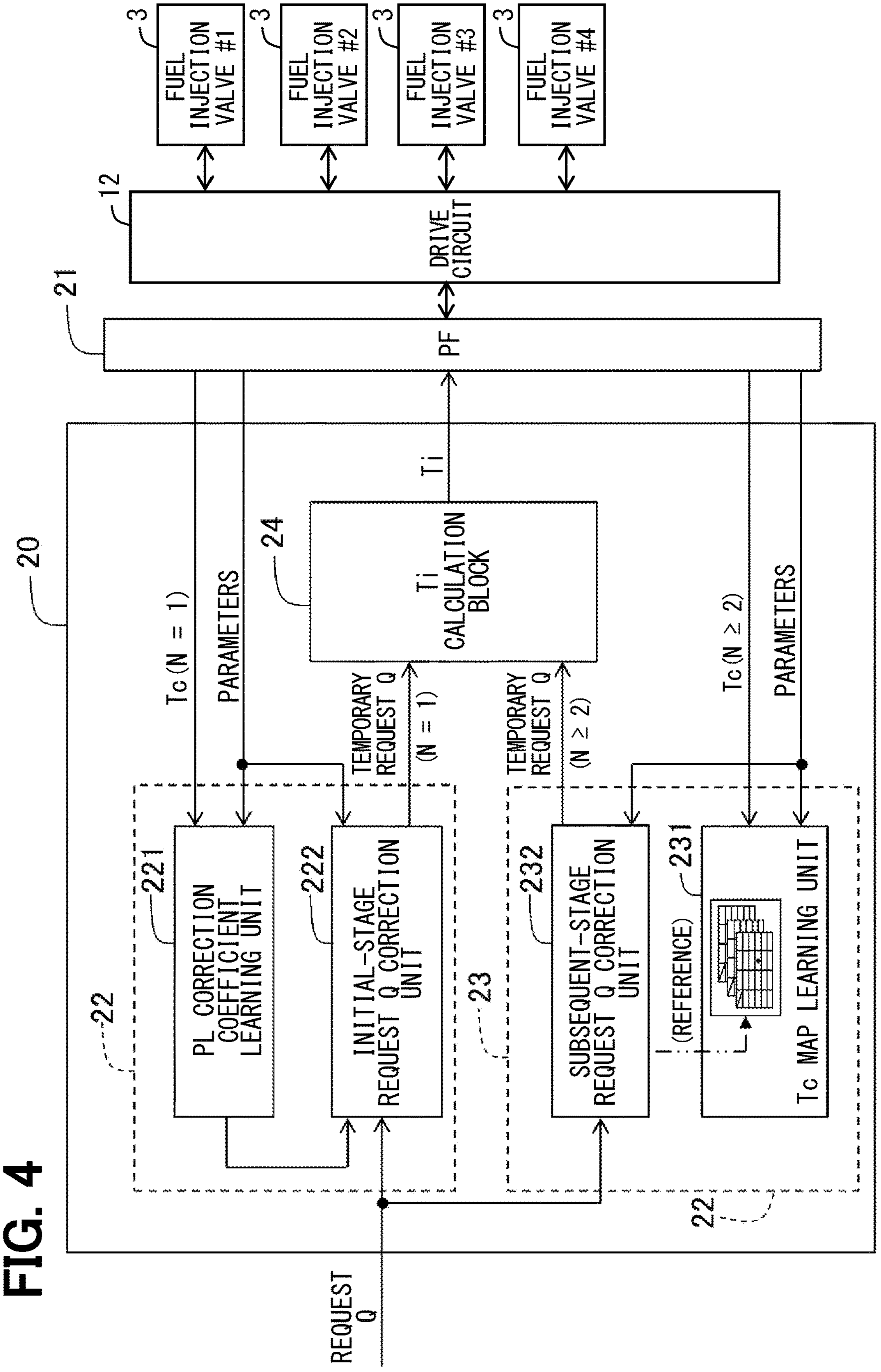
FIG. 4 is a functional block diagram of the injection control device.

As shown in FIG. 4, the injection control unit 20 includes an initial-stage learning block 22, a subsequent-stage learning block 23, and a Ti calculation block 24, and generates a command value to be given to the drive circuit 12. As will be described in detail later, the initial-stage learning block 22 is a functional block that learns the initial-stage injection in the multi-stage injection as in the related art and performs a calculation and correction required for the initial-stage injection. The subsequent-stage learning block 23 is a functional block that learns the subsequent-stage injection in the multi-stage injection and performs a calculation and correction required for the subsequent-stage injection. The Ti calculation block 24 is a functional block that calculates an energization time (Ti), which is a command value to be given to the drive circuit 12, based on an output from the initial-stage learning block 22 or the subsequent-stage learning block 23.

Next, operations and effects of the above-described configuration will be described.

First, learning in the initial-stage learning block 22 will be described. The initial-stage learning block 22 includes a PL correction coefficient learning unit 221 and an initial-stage request Q correction unit 222. The PL correction coefficient learning unit 221 is a functional block that learns a correction coefficient of a partial lift injection. The partial lift injection is a minute injection that shortens a valve opening time and injects a minute amount of fuel by stopping the energization and starting a valve closing operation before the valve body 303 rises to a maximum valve open position.

In the partial lift injection, linearity between the energization time (Ti) and an actual injection amount tends to be low. This is because the rise amount of the valve body 303 varies greatly depending on the mechanical characteristics of the fuel injection valve 3. In a full lift injection in which fuel is injected in a state where the valve body 303 rises to the maximum valve open position, the linearity between the energization time (Ti) and the actual injection amount is high, and an injection amount per unit stroke increases in a form substantially proportional to the energization time.

The PL correction coefficient learning unit 221 learns a PL correction coefficient for correcting an injection amount at the time of the partial lift injection, based on a valve closing time (Tc) of the fuel injection valve 3 at the time of the first injection and parameters. Here, the parameters include, for example, a fuel pressure, a fuel temperature, the energization time (Ti), and an energization pulse interval. However, the parameters are not limited to those illustrated here, and other parameters can be used as necessary. Hereinafter, a fuel injection amount required for one injection is referred to as a request Q.

The PL correction coefficient is given to the initial-stage request Q correction unit 222 as a learning value. In the case of the initial-stage injection and the partial lift injection in the multi-stage injection, the initial-stage request Q correction unit 222 corrects the request Q based on the PL correction coefficient, and outputs the corrected request Q as a temporary request Q to the Ti calculation block 24. When the injection is not the partial lift injection even in the initial-stage injection, the initial-stage request Q correction unit 222 outputs the request Q without correction as the temporary request Q.

As shown in FIG. 4, the Ti calculation block 24 calculates the energization time (Ti) for injecting fuel of the temporary request Q based on the input temporary request Q. At this time, a relation between the energization time (Ti) and a fuel injection amount (Q) is stored in the storage unit 11 in advance as a Ti-Q map 31 which is schematically shown in a graph G1. Hereinafter, a difference between the request Q and the temporary request Q is referred to as an injection correction amount (ΔQ), and an absolute value of the injection correction amount (ΔQ) is referred to as a difference value (q).

For example, when the temporary request Q is larger than the request Q, regarding a relation between the energization time (Ti) and the actual injection amount, the graph G1 is offset in a direction of increasing the injection amount by the difference value (q), as indicated by a dashed line graph G2. In this case, when a fuel injection valve is controlled at Ti1, which is an energization time corresponding to the request Q obtained from the graph G1, since the actual relation is as indicated by the graph G2, an excessive amount of fuel than the request Q is injected. Therefore, the Ti calculation block 24 obtains an energization time to be actually output as Ti2 corresponding to an intersection point between the request Q and the graph G2 based on the request Q and the injection correction amount (ΔQ).

Ti2 corresponds to an energization time corresponding to an intersection point between the graph G1 and a request Q-q when there is no offset in the graph G1. Therefore, as a substantial calculation, a request Q+ΔQ may be obtained, and an energization time corresponding to an intersection point between the request Q+ΔQ and the graph G1 may be obtained. Similar to the case where the temporary request Q is larger than the request Q, the graph G1 is offset in a direction in which the injection amount decreases by the difference value (q), but an energization time to be output can be obtained from the graph G1 by obtaining the request Q+ΔQ.

In the multi-stage injection, a minute injection is performed in which a required total injection amount of fuel required in one cycle is injected multiple times. Since it is assumed that an injection amount of the minute injection varies depending on the mechanical characteristics of the fuel injection valve 3, the initial-stage injection is learned as described above, and the injection amount is corrected using the learning value.

However, in the minute injection in one cycle, it has been found that behavior of the fuel injection valve 3 at the time of the initial-stage injection is different from that at the time of the subsequent-stage injection. This is because the subsequent-stage injection is influenced by an electromotive force or the like at the time of the former-stage injection. In the multi-stage injection, it is conceivable that the influence becomes remarkable because the minute injection is repeated in a short period. Further, since it is considered that a change in the mechanical characteristics of the fuel injection valve 3 influences the valve opening operation and the valve closing operation, it is assumed that the valve opening operation and the valve closing operation are also influenced by the change over time of the fuel injection valve 3.

Therefore, as described below, the injection control device 1 improves the correction accuracy in the multi-stage injection by learning the subsequent-stage injection. As described below, the injection control device 1 reduces a processing load related to the learning.

Figure 6:
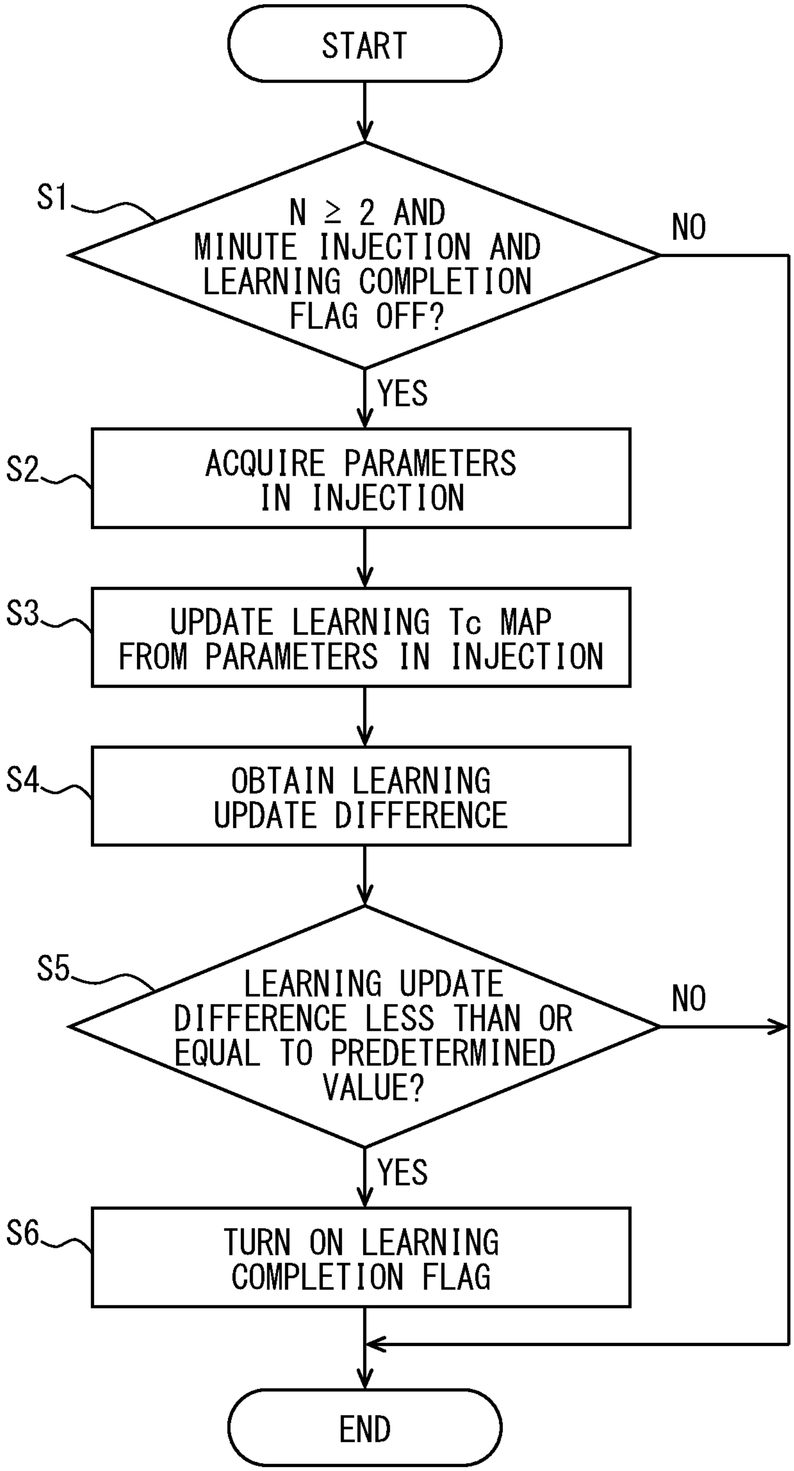
FIG. 6 is a flowchart showing a process of determining necessity of learning.

First, reduction in the processing load will be described. The subsequent-stage learning block 23 includes a Tc map learning unit 231 and a subsequent-stage request Q correction unit 232, as shown in FIG. 4. In the injection control device 1, in order to reduce the processing load at the time of learning, a process shown in FIG. 6 is executed in the Tc map learning unit 231. The Tc map learning unit 231 determines whether N≥2, that is, an injection is the second or subsequent injection and a minute injection, and a learning completion flag is turned off (S1). That is, the Tc map learning unit 231 determines in step S1 whether a condition that requires learning is satisfied.

A learning flag is a flag indicating whether learning is completed. The learning flag is turned on when the learning is completed, and is turned off when the learning is not completed. In the present embodiment, the learning flag is turned off when the injection control device 1 is activated. Therefore, the learning is performed once after ignition is turned on. Accordingly, even when the fuel injection valve 3 changes over time, appropriate correction corresponding to the change over time can be performed.

When it is determined in step S1 that any one of the conditions is not satisfied (S1: NO), the Tc map learning unit 231 ends the process. On the other hand, when it is determined in step S1 that all the conditions are satisfied (S1: YES), the Tc map learning unit 231 acquires parameters at the time of injection (S2). At this time, the Tc map learning unit 231 acquires the valve closing time (Tc), a fuel pressure, a fuel temperature, an injection interval, and the like as the parameters at the time of injection. For example, when other parameters such as the energization time are necessary, the Tc map learning unit 231 also acquires the parameters.

Figure 7:
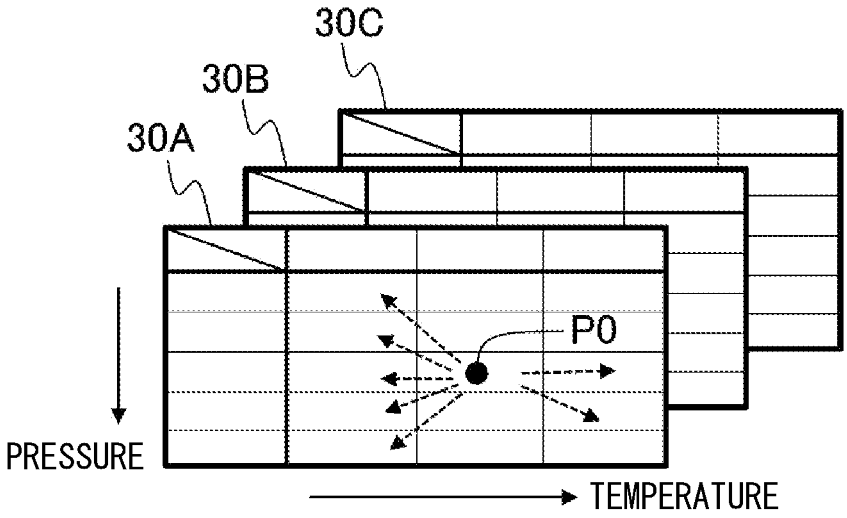
FIG. 7 is a diagram showing an example of a learning Tc map.

Subsequently, the Tc map learning unit 231 updates a learning Tc map 30 using the acquired parameters (S3). The learning Tc map 30 is a data group in which a correspondence relationship between the valve closing time (Tc) and each parameter is stored. Specifically, in the learning Tc map 30, as shown in FIG. 7, for example, a valve closing time corresponding to the fuel pressure and the fuel temperature is stored as learning Tc maps 30A to 30C in association with, for example, the injection interval and the energization time. However, the learning Tc map 30 shown in FIG. 7 is an example.

For example, it is assumed that the shorter the interval, the larger an influence of the former-stage injection on the subsequent-stage injection. Therefore, appropriate correction can be performed by storing a valve closing time according to the interval in the learning Tc map 30. It is assumed that even when the intervals are the same, the injection amount changes depending on the fuel pressure. Therefore, appropriate correction can be performed by storing a valve closing time according to the fuel pressure in the learning Tc map 30. That is, the Tc map learning unit 231 learns each of multiple parameters, so that appropriate correction can be performed at the time of the next and subsequent injections.

In the case of first learning, since no correspondence relationship between a valve closing time and each parameter is stored, the Tc map learning unit 231 associates a valve closing time acquired this time with each parameter, and records the valve closing time as an initial learning point in a corresponding region (P0). The Tc map learning unit 231 weights a value of the initial learning point to estimate and store a valve closing time in other regions as partly indicated by dashed lines, thereby updating the learning Tc map 30.

On the other hand, in the case of the second and subsequent learning, the Tc map learning unit 231 applies smoothing to remove a noise component with respect to the valve closing time corresponding to the acquired parameter, and stores the valve closing time. That is, the Tc map learning unit 231 learns the valve closing time to update the learning Tc map 30. Accordingly, even when the behavior of the fuel injection valve 3 in the second and subsequent injections is different due to the influence of the electromotive force of the former-stage injection or the like, the learning Tc map 30 in a state where a difference in the behavior is absorbed can be obtained.

Subsequently, the Tc map learning unit 231 obtains a learning update difference which is a difference between the stored value and the updated value (S4), and determines whether the learning update difference is less than or equal to a predetermined value (S5). In this case, the Tc map learning unit 231 determines whether the learning update difference is less than or equal to the predetermined value based on, for example, an absolute value of the learning update difference, a ratio of the learning update difference to a previous value, and the like.

When determining that the learning update difference is not less than or equal to the predetermined value (S4: NO), the Tc map learning unit 231 ends the process without changing the learning completion flag. Therefore, when learning is the first learning or when the learning value is not stable, the learning is repeated.

On the other hand, when determining that the learning update difference is less than or equal to the predetermined value (S4: YES), the Tc map learning unit 231 turns on the learning completion flag (S5), and then ends the process. In the present embodiment, since the learning is completed from the end of the injection to the start of the next injection, the processing load is increased. Therefore, when the learning value is stable, the Tc map learning unit 231 does not perform the next learning by turning on the learning flag. That is, the injection control device 1 is configured to stop the learning when the learning value is stable.

The learning Tc map 30 is referred to by the subsequent-stage request Q correction unit 232 as shown in FIG. 4, and is used for correction of the request Q. Specifically, the subsequent-stage request Q correction unit 232 performs a process shown in FIG. 8, corrects the request Q in a procedure shown in FIG. 9, and obtains the temporary request Q.

The subsequent-stage request Q correction unit 232 determines whether N≥2, that is, an injection is the second or subsequent injection and a minute injection (S11). When determining that N≥2 is not satisfied, or the injection is not a minute injection (S11: NO), the subsequent-stage request Q correction unit 232 outputs the request Q without correction to the Ti calculation block 24 as the temporary request Q in the current injection (S17), and ends the process.

On the other hand, when determining that N≥2 and the injection is a minute injection (S11: YES), the subsequent-stage request Q correction unit 232 acquires a parameter necessary for correction (S12). In step S12, for example, parameters such as an energization time, an interval, a fuel pressure, and a fuel temperature are acquired or calculated. When other parameters are necessary, the other parameters are also acquired or calculated.

Figure 9:
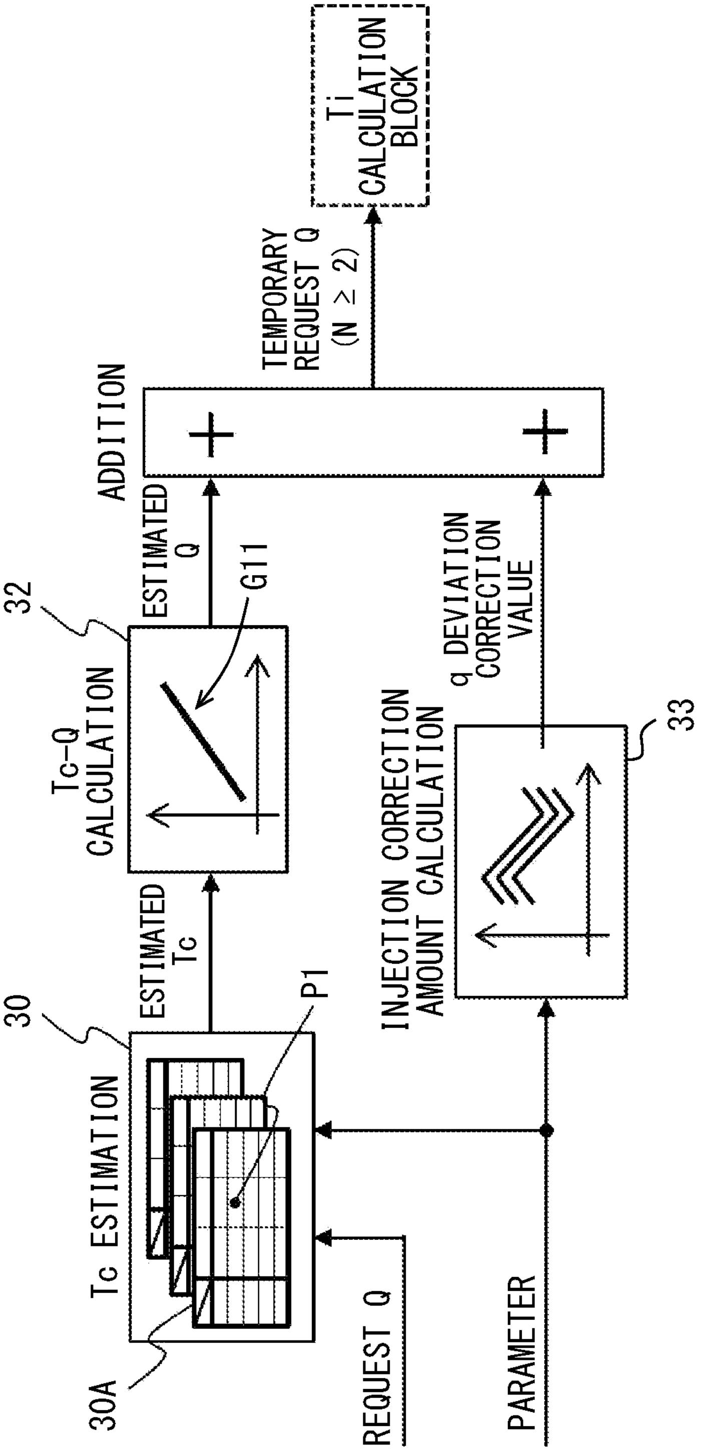
FIG. 9 is a diagram illustrating a flow of calculations performed by a subsequent-stage request Q correction unit.

When the parameters are acquired, the subsequent-stage request Q correction unit 232 obtains an estimated Tc from the learning Tc map 30 (S13). This estimated Tc is a valve closing time corresponding to the request Q, and is a learning value stored in the region (P1) corresponding to the fuel temperature and the fuel pressure in the learning Tc map 30A corresponding to the energization time obtained from the request Q, as shown in FIG. 9. As described above, for example, even when the fuel pressure and the fuel temperature are the same, the subsequent-stage request Q correction unit 232 calculates an appropriate estimated Tc according to, for example, the energization time and the interval. For example, even when the interval is the same, the subsequent-stage request Q correction unit 232 calculates an appropriate estimated Tc according to the fuel pressure and the fuel temperature.

Figure 8:
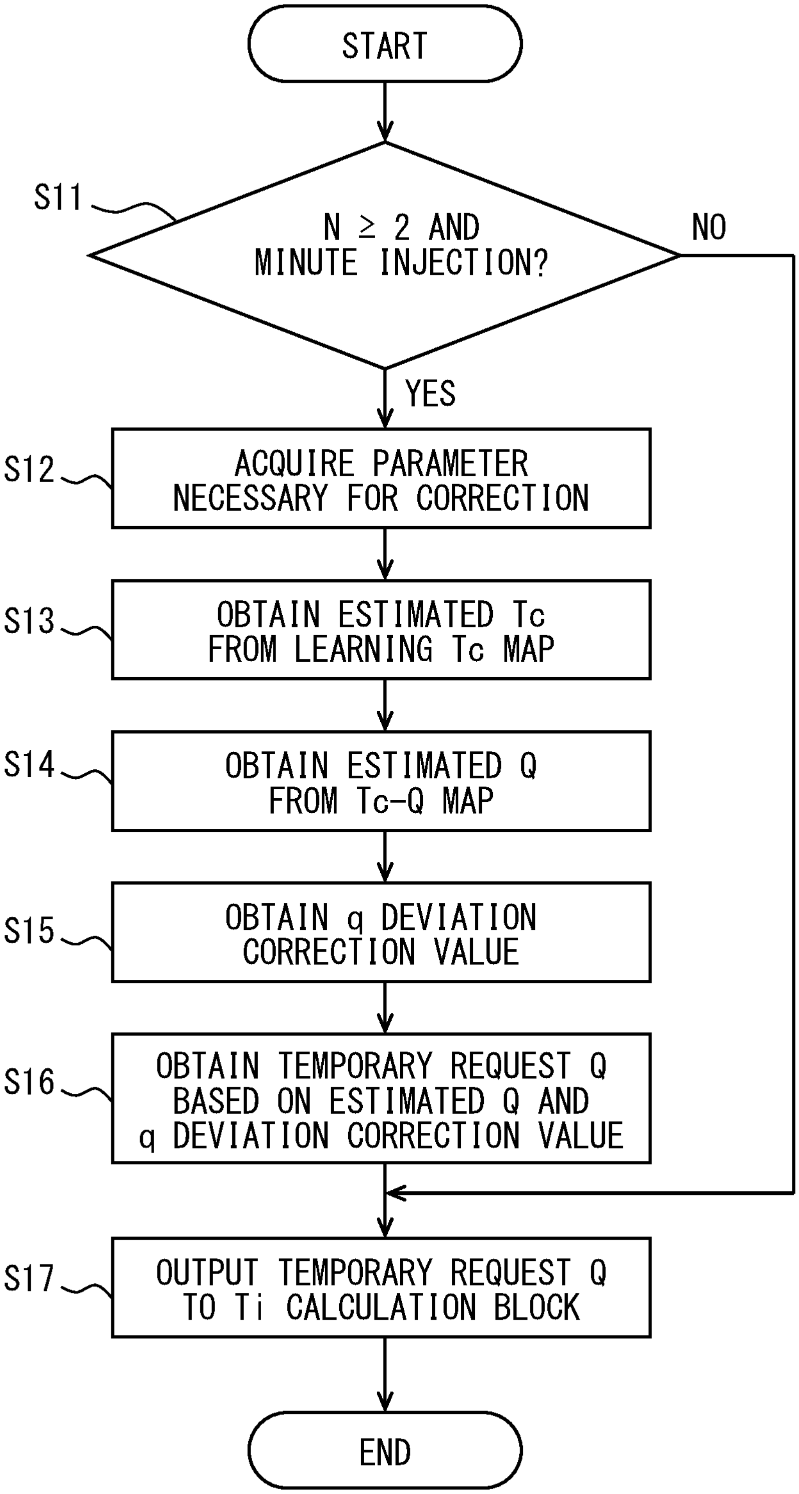
FIG. 8 is a flowchart showing a process of learning a subsequent-stage injection.

Subsequently, the subsequent-stage request Q correction unit 232 obtains an estimated Q from a Tc-Q map 32 as shown in FIG. 8 (S14). As schematically shown as a graph G11 in FIG. 9, a relation between the valve closing time (Tc) and the injection amount (Q) is stored in the Tc-Q map 32 in association with each other in advance. Therefore, the subsequent-stage request Q correction unit 232 refers to the Tc-Q map 32 and obtains an injection amount corresponding to the estimated Tc as the estimated Q.

Figure 5:
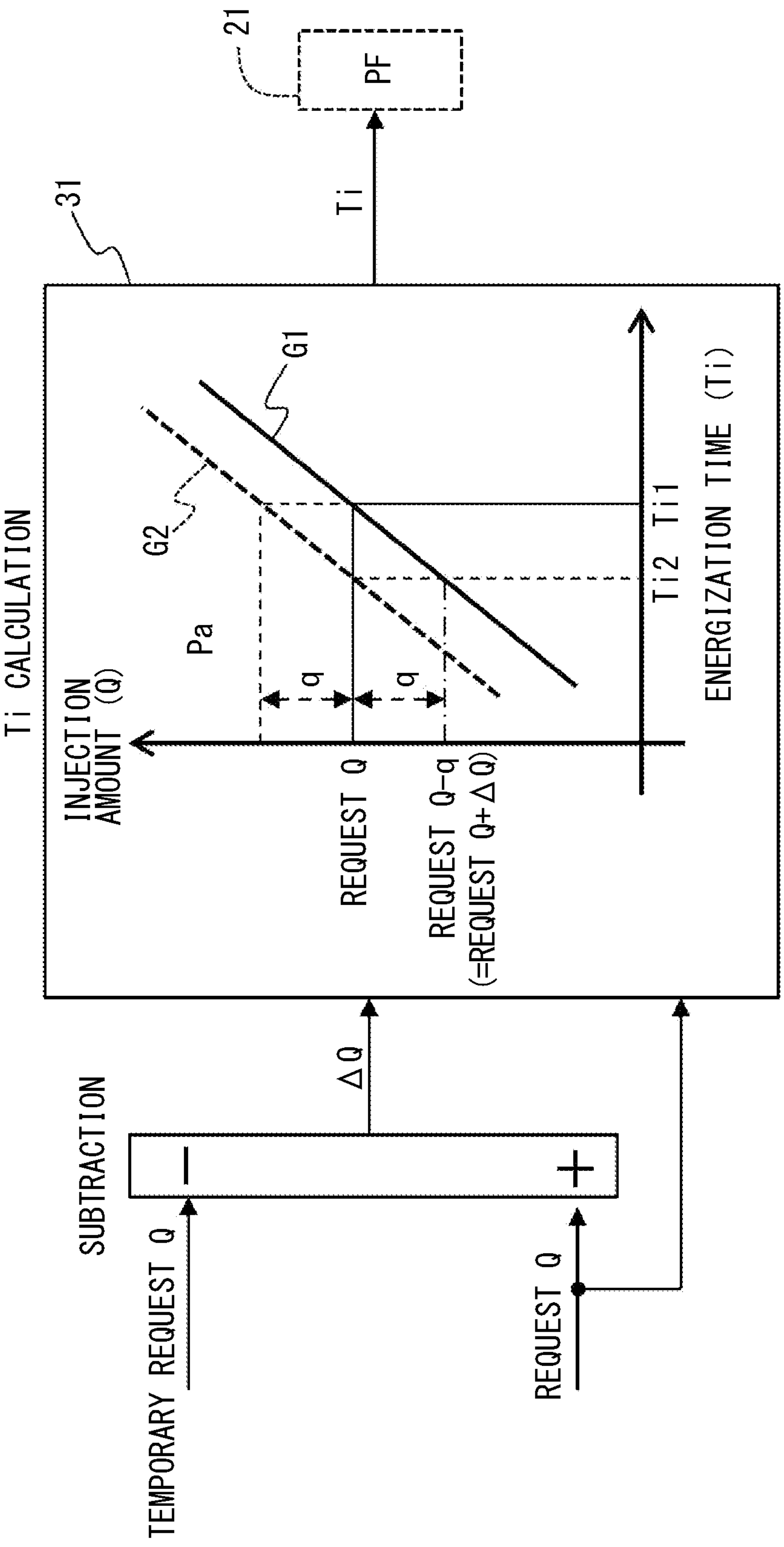
FIG. 5 is a diagram illustrating a flow of calculations performed by a Ti calculation block.

As shown in FIG. 8, the subsequent-stage request Q correction unit 232 obtains a q deviation correction value (S15). As shown in FIG. 9, the q deviation correction value is obtained based on a correction map 33 in which a relation between the deviation of the opening of the fuel injection valve 3 and the correction value is stored in advance. As shown in FIG. 8, the subsequent-stage request Q correction unit 232 adds the estimated Q and the q deviation correction value to obtain a temporary request Q in the subsequent-stage injection (S16), outputs the obtained temporary request Q to the Ti calculation block 24 (S17), and ends the process. In the Ti calculation block 24, the energization time (Ti) is calculated based on the temporary request Q as shown in FIG. 5.

In this way, the injection control device 1 learns the second and subsequent injections of the multi-stage injection, and enables appropriate correction according to the behavior of the fuel injection valve 3 from the second and subsequent injections, thereby improving the correction accuracy in the multi-stage injection.

According to the injection control device 1 described above, the following effects can be obtained.

The injection control device 1 includes the injection control unit 20 that controls the fuel injection valve 3, which is driven by a charging voltage obtained by boosting a battery voltage, to perform a multi-stage injection in which fuel injection is performed multiple times in one cycle for each cylinder. The injection control unit 20 learns the second and subsequent minute injections in the multi-stage injection, and corrects the injection amount. Accordingly, even when behavior of the fuel injection valve 3 in the second and subsequent injections is different from behavior in the first injection due to an influence of the electromotive force of the former-stage injection or the like, a difference in behavior can be corrected by performing learning, and correction accuracy in the multi-stage injection can be improved. By learning all the injections as in the embodiment, even when the behavior of third and subsequent injections is different from the behavior at the time of a previous injection, it is possible to improve the correction accuracy in the multi-stage injection.

Since the fuel injection valve 3 repeats the fuel injection in a relatively short cycle at the time of the minute injection, it is conceivable that the fuel injection valve 3 is easily influenced by the electromotive force of the former-stage injection and the like. It is also conceivable that the behavior itself of the fuel injection valve 3 changes over time. Therefore, the injection control device 1 performs learning and correction on the fuel injection valve 3 that includes the valve body 303 which is pressed against the injection hole 306 by a spring member, and that is configured such that the valve body 303 is driven in response to a drive signal based on a command value output from the injection control unit 20 so as to inject fuel from the injection hole 306. Accordingly, the injection amount can be corrected in a state where the difference in the behavior at the time of the second or subsequent minute injections is absorbed, and in a state where the change in behavior due to the change over time is also absorbed, and the correction accuracy in the multi-stage injection can be improved.

The injection control device 1 corrects the injection amount by learning each parameter used to calculate the injection amount. Accordingly, even when, for example, the fuel has the same pressure or the same temperature, in a case where the energization time is different, it is possible to obtain an appropriate valve closing time (Tc) according to the energization time, and it is possible to improve the correction accuracy in the multi-stage injection.

The injection control device 1 stops the learning when the learning value is stable. Since the injection control device 1 needs to complete learning from the end of the injection to the start of the next injection, the processing load tends to be increased. On the other hand, since it is conceivable that the mechanical characteristics of the spring member and the like of the fuel injection valve 3 are not so remarkable with deterioration in each cycle, it is possible to reduce the load by stopping the learning in a state where the learning value is stable.

In the embodiment, a configuration in which the learning is stopped in a state where the learning value is stable is exemplified, but the load may be reduced by limiting the number of times of valve closing detection for detecting the valve closing time (Tc) of the fuel injection valve 3. For example, the valve closing detection may be performed in the second injection in one cycle shown in FIG. 3, and the valve closing detection may not be performed in the third and subsequent injections. For example, a process of determining a flag indicating whether the learning has been performed at the time of the previous injection may be added to the process in FIG. 6, and the valve closing detection may not be performed in a next cycle of the cycle in which the valve closing detection is performed. For example, a process of counting an injection to be learned may be added to the process in FIG. 6, and the valve closing detection may be performed for each predetermined number of cycles. The limitation of the number of times of valve closing detection and the stop of the learning in a state where the learning value is stable may be combined.

Accordingly, the injection amount can be corrected in a state where the difference in the behavior of the fuel injection valve 3 at the time of the minute injection is absorbed, and in a state where the change in behavior due to the change over time is also absorbed, and the correction accuracy in the multi-stage injection can be improved. Since the load can be reduced, a wide variety of ICs used for the control circuit 10 and the drive circuit 12 can be used.

The injection control unit 20 can select whether to perform learning in accordance with the processing load when the learning value is stable. For example, when a rotational speed of the internal combustion engine 2 is high, one cycle shown in FIG. 3 is shortened, and the interval of the minute injection is also shortened. In this case, although the load increases when learning is performed for each injection, for example, by incorporating the determination of the load in step S1 of FIG. 6, learning may not be performed when the load is large. Accordingly, the learning and the correction can be performed without excessively increasing the performance of the control circuit 10. In this case, the injection control unit 20 may perform learning when a low-load process with a long delay until the process is completed is executed. Accordingly, a load on learning can be reduced.

The injection control unit 20 may execute learning itself as a low-load task with a long delay. That is, the learning load itself may be reduced, for example, a process of determining a level of the load may be incorporated before and after step S1 in FIG. 6, and learning may be performed in a state where the load is low. This is because, as described above, the mechanical characteristics of the spring member and the like of the fuel injection valve 3 are considered to be not so remarkable with deterioration in each cycle.

The classification of the functional blocks and the content of calculations in charge described in the embodiment are examples, and it is possible to appropriately select how to allocate the functional blocks and the content of calculations. That is, the injection control device 1 may learn the second and subsequent minute injections in the multi-stage injection as a whole to correct the injection amount.

The control unit and the method described in the present disclosure may be implemented by a dedicated computer provided by forming a processor and a memory programmed to execute one or more functions embodied by a computer program. Alternatively, the control unit and the method described in the present disclosure may be implemented by a dedicated computer provided by forming a processor with one or more dedicated hardware logic circuits. Alternatively, the control unit and the method described in the present disclosure may be implemented by one or more dedicated computers formed by a combination of a processor and a memory programmed to execute one or more functions and a processor configured by one or more hardware logic circuits. The computer program may also be stored on a computer readable and non-transitory tangible recording medium as instructions executed by a computer.

What is claimed is:

1. An injection control device comprising:

an injection controller configured to control a fuel injection valve, which is driven by a charging voltage obtained by boosting a battery voltage, to perform a multi-stage injection in which fuel injection is performed a plurality of times in one cycle for each cylinder, wherein the injection controller is configured to perform learning of at least one of a second minute injection and a further minute injection, the further minute injection being subsequent to the second minute injection in the multi-stage injection, and correcting of an injection amount of the at least one of the second minute injection and the further minute injection.

2. The injection control device according to claim 1, wherein the injection controller is configured to perform the correcting of the injection amount by learning respective parameters used to calculate the injection amount.

3. The injection control device according to claim 1, wherein the injection controller is configured to stop the learning when a learning value of the learning becomes stable.

4. The injection control device according to claim 1, wherein the injection controller is configured to limit a number of times of valve closing detection of the fuel injection valve when a learning value of the learning becomes stable.

5. The injection control device according to claim 1, wherein the injection controller is configured to select whether to perform the learning in accordance with a processing load when a learning value of the learning becomes stable.

6. The injection control device according to claim 1, further comprising:

a determiner configured to determine whether the multi-stage injection is performed, wherein the injection controller is configured to, in response to determination of the determiner that the multi-stage injection is performed, perform the learning of the at least one of the second minute injection and the further minute injection that is subsequent to the second minute injection in the multi-stage injection and the correcting of the injection amount of the at least one of the second minute injection and the further minute injection.

7. An injection control device comprising:

a processor configured to control a fuel injection valve, which is driven by a charging voltage obtained by boosting a battery voltage, to perform a multi-stage injection in which fuel injection is performed a plurality of times in one cycle for each cylinder, perform learning of at least one of a second minute injection a and a further minute injection, the further minute injection being subsequent to the second minute injection in the multi-stage injection, and perform correcting of an injection amount of the at least one of the second minute injection and the further minute injection.

* * * * *